Patented Feb. 19, 1929.

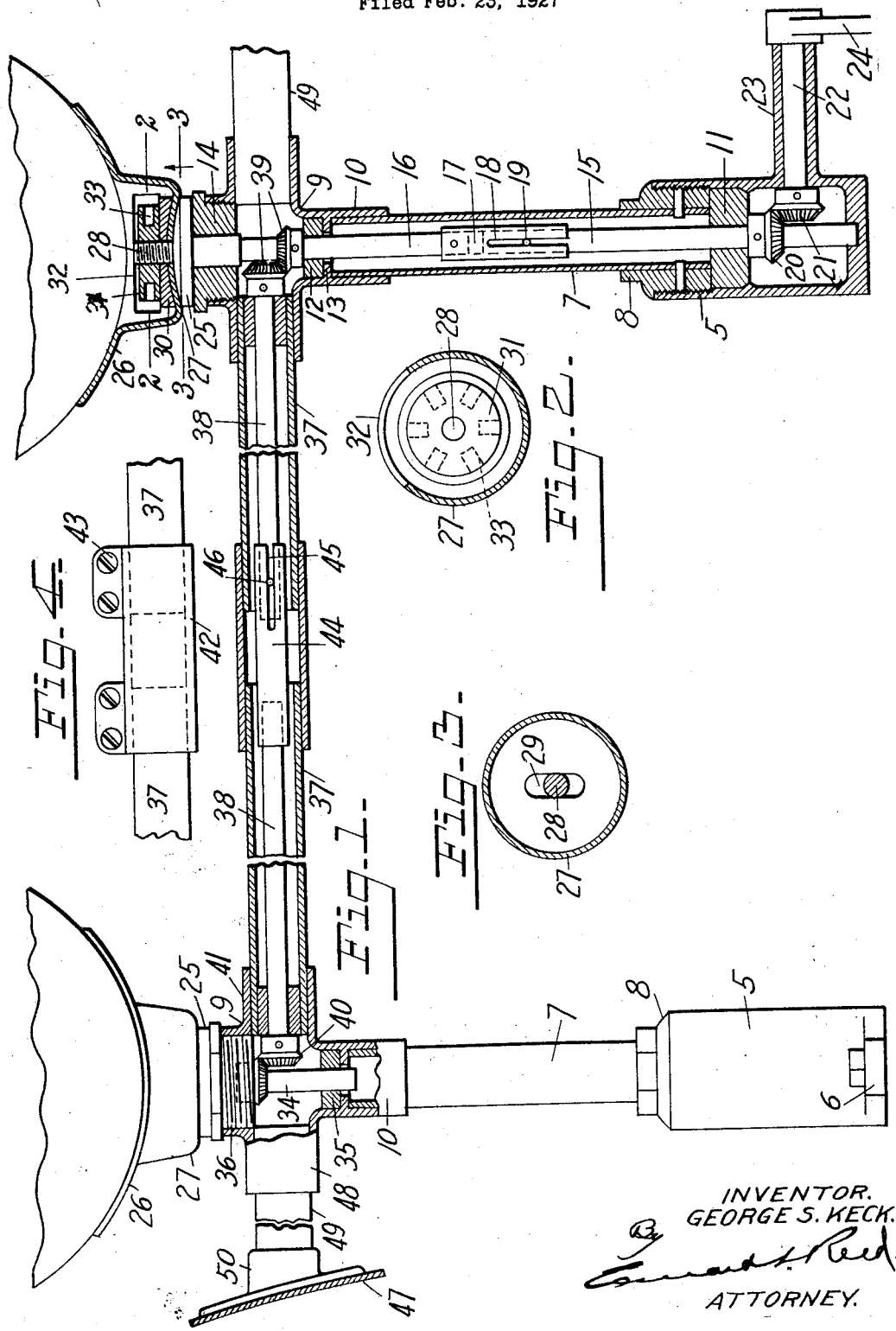

1,702,513

UNITED STATES PATENT OFFICE.

GEORGE S. KECK, OF PASADENA, CALIFORNIA, ASSIGNOR TO PILOT RAY CORPORATION, OF WILMINGTON, DELAWARE, A CORPORATION OF DELAWARE.

DIRIGIBLE HEADLIGHT MECHANISM.

Application filed February 23, 1927. Serial No. 170,086.

This invention relates to dirigible headlight mechanism and one object of the invention is to provide such a mechanism which will be simple and compact in its arrangement, of a strong rigid character, and pleasing in appearance.

A further object of the invention is to provide such a mechanism in which the supporting structure will be of such a character that the actuating devices for the lamps may be mounted wholly within the same, and thus concealed from view.

Other objects of the mechanism will appear as the mechanism is described in detail.

In the accompanying drawings Fig. 1 is a vertical sectional view, partly in elevation, of a headlight installation embodying my invention; Fig. 2 is a section taken on the line 2—2 of Fig. 1; Fig. 3 is a section taken on the line 3—3 of Fig. 1 looking in the direction of the arrows; and Fig. 4 is a plan view of a portion of the transverse bar.

In these drawings I have illustrated one embodiment of my invention and have shown the same as comprising two upright hollow standards each of which supports one of the headlights and in which actuating mechanism consisting of shafts and gearing is arranged to cause the two headlights to be moved in unison. It will be understood that this particular arrangement of the mechanism has been chosen for the purpose of illustration only and that the mechanism may take various forms without departing from the spirit of the invention.

As here shown, each standard comprises a base 5 having means, such as apertured lugs 6 for rigidly securing the same to one of the side members of an automobile frame. The base is hollow and has secured to its upper end an upwardly extending tubular arm 7. This arm may be secured to the base in any suitable manner but, in the present instance, a cap or plug 8 is screw threaded into the upper end of the base and is provided with a central opening in which the lower end of the tubular arm 7 is rigidly secured. The upper portion of the cap overlaps the upper edge of the hollow base and is rounded or otherwise shaped to give the structure as a whole an attractive appearance. Mounted on the upper end of the tubular arm 7 is a coupling member 9. This coupling member may take various forms but, as here shown, it is hollow and has a depending tubular portion or boss 10 in which the upper end of the tubular arm 7 is arranged. The base, arm and connecting member constitute the supporting member or standard. A headlight is mounted on the upper portion of each connecting member, and arranged within each standard is actuating mechanism for imparting rotatory movement to the headlight. As here shown, one of the standards has a bearing 11 mounted in the base adjacent to the cap 8, and a second bearing 12 mounted in the lower portion of the connecting member 9 and supported by a flange 13. Mounted in the upper portion of the connecting member is a screw threaded cap 14 which constitutes a bearing and a supporting member for the lamp. Journaled in these bearings is a vertical shaft which is here shown as comprising a lower portion 15, journaled in the bearing 11, and an upper portion 16 journaled in the bearings 12 and 14. The two parts of the shaft are connected together by a sleeve 17 which is rigidly secured to one part thereof and has a longitudinal slot 18 to receive a pin 19 on the lower portion of the shaft, the arrangement being such that the two parts of the shaft are rigidly connected for rotatory movement but are separable and are longitudinally adjustable, thus facilitating the assembly of the mechanism and permitting of a longitudinal adjustment of the shaft to accommodate the same to standards of different length. Rigidly secured to the lower portion of the shaft, beneath the bearing 11, is a beveled gear 20 which meshes with a second beveled gear 21 secured to a shaft 22 mounted in a laterally extending sleeve or elongated bearing 23 which, in the present instance, is formed integral with the base. The shaft extends beyond the outer end of the bearing 23 and has secured thereto suitable means, such as a crank arm 24, for connecting the same with the steering mechanism of the automobile, so that the movement of the steering mechanism will impart rotatory movement to the vertical shaft.

The upper end of the vertical shaft extends beyond the upper bearing 14 and is connected with the headlight which is supported by that standard, the connection being preferably adjustable to permit the headlight to be tilted with relation to the standard. In the present arrangement the shaft has rigidly secured thereto, and, if desired, formed integral therewith, a collar 25 which is arranged adjacent to or in light contact with the upper surface of the bearing member 14. The upper surface of the collar 25 is convex and forms a support for the lamp casing 26 which, as here shown, has a depending portion 27 constituting a supporting bracket and provided with a concave lower surface to engage the convex upper surface of the collar 25. Rigidly secured to the collar 25, centrally thereof, and constituting a continuation of the vertical shaft, is a screw threaded stud 28. This stud extends through an opening, preferably an elongated slot 29 in the lower portion of the supporting bracket 27 and mounted on the upper surface of the bracket and embracing the stud 28, is a washer 30 having a concave lower surface to engage the lower wall of the supporting bracket. A nut 31 screw threaded on the upper portion of the stud serves to clamp the supporting bracket firmly between the collar 25 and the washer 30 and thus rigidly connect the lamp with the shaft without interfering with the free rotation of the shaft. Preferably the rear wall of the depending portion or supporting bracket 27 is cut away, as shown at 32, in Fig. 2, to permit access to the nut 31, this nut being here shown as having a series of radial sockets 33 to receive a pin or other actuating device.

The second standard is similar in construction to the standard just described but the vertical shaft, which is shown at 34, is comparatively short and is supported wholly by the bearings 35 and 36 in the lower and upper portions of the connecting member 9. This shaft, however, is secured to the headlight in the manner above described. The two standards are rigidly connected together and braced one against the other by a transverse bar or tubular member 37 in which is rotatably mounted a shaft 38 which is connected at one end, by beveled gears 39, with that portion of the shaft 16 which extends through the member 9 of the first mentioned standard. At its other end this shaft is connected by means of beveled gears 40 with the vertical shaft 34 in the other standard, the arrangement of the beveled gearing being such that the movement of the one vertical shaft will be transmitted to the other and the two headlights will be caused to move in unison in the same direction. As here shown, the tubular bar 37 is mounted in laterally extending tubular portions or bosses 41 forming parts of the respective coupling members 9, the ends of the bar being rigidly clamped within the bosses, or otherwise firmly secured thereto. Preferably the bar is formed in two parts and the adjacent ends of the two parts adjustably connected one to the other. As here shown, the adjacent ends of the two parts of the bar are secured in a split sleeve 42 which is clamped tightly about the same by means of screws 43, thus providing a rigid bar which can be adjusted longitudinally to accomodate it to the distance between the upright standards. The shaft 38 is also preferably in two parts, these parts being connected by a sleeve 44 rigidly secured to one of them and having a slot 45 to receive a pin 46 secured to the other part of the shaft, thus causing the two shafts to rotate in unison but permitting of the longitudinal adjustment of the shaft as a whole and also facilitating the assembly of the mechansim.

I also prefer to brace the standards against the adjacent fenders 47 and, as here shown, each connecting member has an outwardly extending tubular portion or boss 48 in which is seated a rod or brace bar 49, the outer end of which has secured thereto a head 50 which is rigidly secured to the adjacent fender.

The construction and operation of the mechanism will be readily understood from the foregoing description and it will be apparent that I have provided a supporting structure and operating mechanism for the headlights which is very simple in its construction, is of a strong rigid character and within which all the operating mechanism is concealed with the exception of the crank arm 24, and this being arranged beneath the fender is not conspicuous. The mechanism can be readily assembled and is adjustable to accommodate it to automobiles of different kinds. The height of the lamps may be varied by varying the length of the upright arms 7 and the distance between the upright standards may be varied by adjusting the length of the transverse bar 27, the shaft 38 automatically accommodating itself to the distance between the vertical shafts.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a dirigible headlight mechanism, a pair of upright hollow standards each having at its lower end a base to be secured to the frame of an automobile and having at its upper end a connecting member, a hollow transverse bar rigidly connected at its ends with the respective connecting members, vertical shafts journaled in the respective upright standards and extending through said connecting members, headlights rigidly secured to the upper ends of the respective vertical shafts, a transverse shaft mounted in said transverse bar, intermeshing gears arranged in the respective connecting members and secured to said transverse shaft and the respective vertical shafts, and means for operatively connecting one of said vertical shafts with the steering mechanism of said automobile.

2. In a dirigible headlight mechanism, a pair of upright standards, each comprising a hollow base, a tubular arm secured to and extending upwardly from said base, a connecting member having a tubular portion to receive the upper end of said arm, each connecting member also having laterally extending tubular portions, a transverse tubular bar having its ends mounted in the inner tubular portions of the respective connecting members, brace bars mounted in the outer tubular portions of said connecting members and having means for connecting the same with the fenders of an automobile, vertical shafts rotatably mounted in the respective connecting members and extending above the same, means for rigidly securing a headlight to the upper end of each of said shafts, a transverse shaft mounted in said transverse bar, gears for connecting said transverse shaft with the respective vertical shafts, one of said vertical shafts extending downwardly into the base of its standard, an operating shaft journaled in said base, and a geared connection between said operating shaft and said vertical shaft.

3. In a dirigible headlight mechanism, an upright hollow standard having at its lower end means for mounting the same on an automobile, a vertical shaft rotatably mounted in said standard, extending above the same and having its upper end screw threaded, means for operatively connecting said shaft with the steering mechanism of said automobile, a collar mounted on said shaft below the upper end thereof and having a convex upper surface, a headlight having a concavo-convex part seated on said collar and having a slot to receive said shaft, a clamping plate having a concave lower surface engaging the upper surface of said part of said headlight, and a nut on the threaded end of said shaft acting on said clamping plate.

In testimony whereof, I affix my signature hereto.

GEORGE S. KECK.